United States Patent [19]

Nigol et al.

[11] 4,385,201

[45] May 24, 1983

[54] COULOMB-TYPE VIBRATION ABSORBER FOR SUSPENDED CABLES AND SINGLE SUSPENDED CABLE COMBINED THEREWITH

[75] Inventors: Olaf Nigol, Etobicoke; Herbert J. Houston, Oakville, Canada

[73] Assignee: Slater Steel Industries, Ltd., Hamilton, Canada

[21] Appl. No.: 345,650

[22] Filed: Feb. 4, 1982

Related U.S. Application Data

[63] Continuation-in-part of Ser. No. 300,751, Sep. 10, 1981, which is a continuation-in-part of Ser. No. 216,870, Dec. 16, 1980, abandoned.

[51] Int. Cl.³ .............................................. H02G 7/14
[52] U.S. Cl. ........................................................ 174/42
[58] Field of Search ......................................... 174/42

[56] References Cited

U.S. PATENT DOCUMENTS

3,474,184  10/1969  Crosby et al. ..................... 174/42
3,885,086  5/1975  Houston et al. .................... 174/42

FOREIGN PATENT DOCUMENTS

570780  2/1959  Canada ................................ 174/42

Primary Examiner—Laramie E. Askin
Attorney, Agent, or Firm—Burgess, Ryan & Wayne

[57] ABSTRACT

A vibration absorber for attachment to a single conductor suspended transmission line to suppress vertical aeolian vibrations. A clamp arm has one end attached to a suspended cable and another end rotatably coupled to a housing having a weight extending therefrom through two frictionally-engaged elements which provide coulomb friction when the clamp arm is caused to rotate relative to the housing as a result of said vibrations. A separate resilient member couples the clamp arm to the housing to restore the initial orientation of the clamp arm.

10 Claims, 9 Drawing Figures

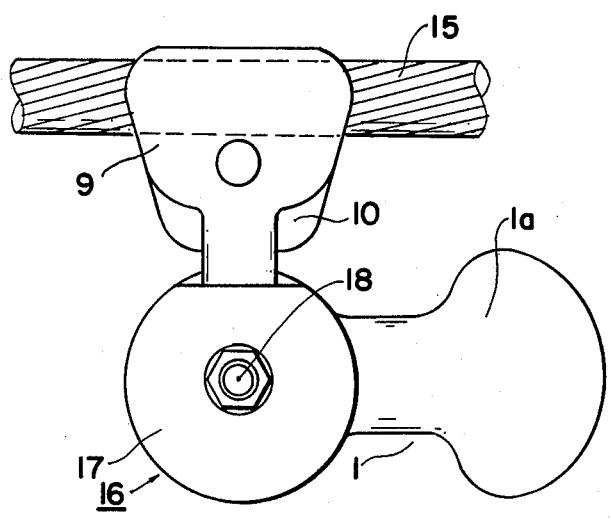
FIG. IA
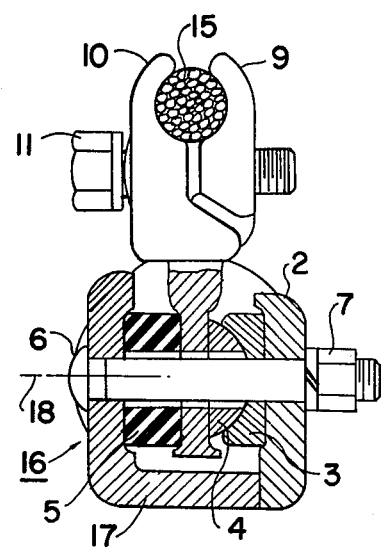
FIG. IB
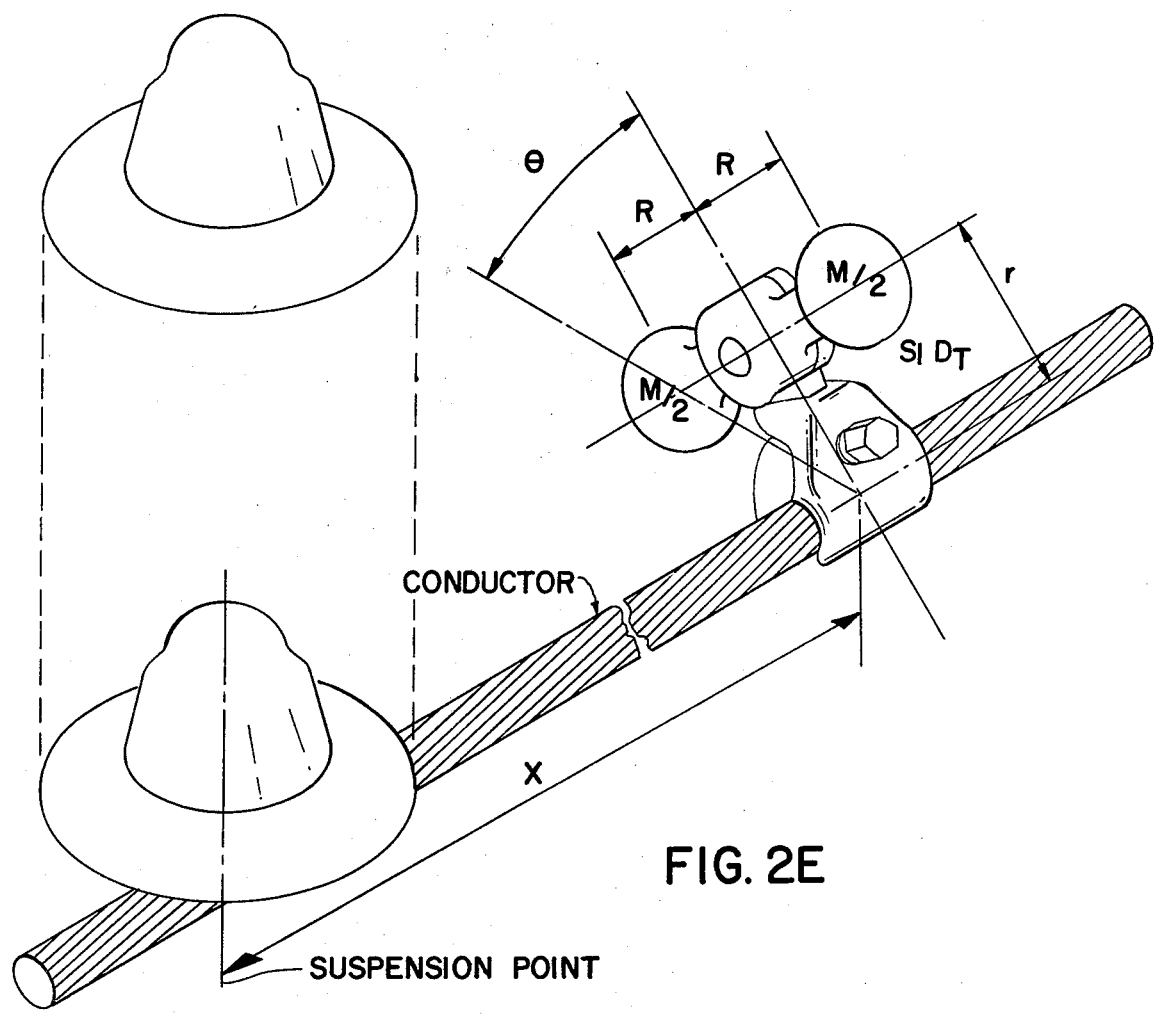
FIG. 2E

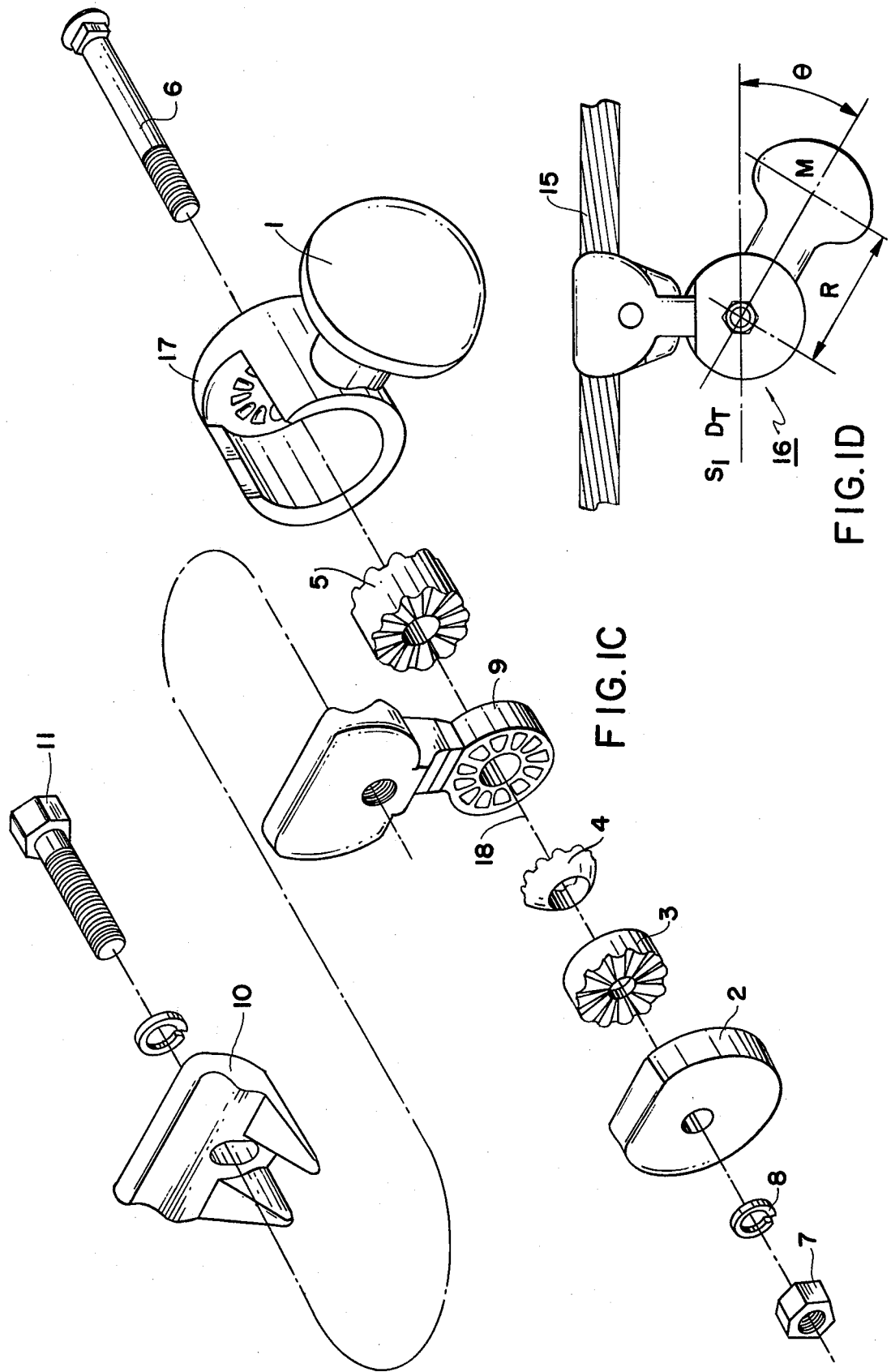

COULOMB-TYPE VIBRATION ABSORBER FOR SUSPENDED CABLES AND SINGLE SUSPENDED CABLE COMBINED THEREWITH

RELATED APPLICATIONS

This application is a continuation-in-part of co-pending application Ser. No. 300,751, filed Sept. 10th, 1981 and assigned to the assignee of the instant application; said co-pending application being a continuation-in-part of prior application Ser. No. 216,870, filed Dec. 16, 1980, now abandoned.

BACKGROUND OF THE INVENTION

This application is directed to an improved vibration absorber for individual suspended cables including but not limited to electrical transmission lines; and more specifically to a device for absorbing energy to suppress aeolian vibration of such cables.

The vibration absorber herein described operates on the principles disclosed in co-pending U.S. Patent Application Ser. No. 147,096, filed May 7th, 1980 (now issued as U.S. Pat. No. 4,346,255), assigned to the assignee of the present application and entitled "overhead electrical conductor system including SUBSPAN OSCILLATION AND AEOLIAN VIBRATION ABSORBER FOR SINGLE AND BUNDLE CONDUCTORS". This prior application discloses and claims an essentially dissipative (as opposed to spring-type) vibration absorber having a damping mechanical impedance which essentially matches the mechanical impedance of the transmission line to which the damper is attached. The acceptable range of damper impedance of the absorber is indicated as being anywhere between half and three times the transmission line mechanical impedance.

By essentially matching the transmission line mechanical impedance, and providing a dissipative (i.e., frequency independent) damping effect, the vibration absorber of the aforesaid U.S. Patent Application Ser. No. 147,096 provides optimum energy coupling between the transmission line and absorber, thus effectively absorbing travelling waves on the line before they build up to large amplitude standing waves which can cause damage to the line and associated supporting elements.

Until the aforesaid invention was made, prior art spring-type dampers had to be designed so that they operated effectively over the resonant frequency range of the transmission line to be damped. These dampers also had to be situated at points on the transmission line where standing waves would be of relatively large amplitude, i.e., at distances of a quarter wavelength from adjacent nodes.

The invention of U.S. Patent Appln. Ser. No. 147,096 relates to the use of vibration absorbers which can be connected to transmission lines to provide essentially dissipative damping. That is, these dampers utilize viscous-type effects, so that damping is essentially frequency independent. In contradistinction, those prior art dampers which utilized springs or other resilient elements had undesirable resonance characteristics. A typical prior art vibration damper of this type is shown in U.S. Pat. No. 3,885,086. The vibration damper shown in this patent, however, is unsuitable for use in the arrangement contemplated by the aforementioned U.S. Patent Appln. Ser. No. 147,096, because it is incapable of providing the critical dissipative damping required. In U.S. Pat. No. 3,885,086, the annular washers 12 are situated between clamp arms 16 and adjacent frame portions 10, and secured thereto so that said washers do not rotate. The washers are of a resilient material, so that rotation of the clamp arm 16 results in deformation of the washers, the resilient characteristics of which then return the clamp arms to their initial orientations. In this arrangement, the only dissipative damping effects are provided by hysteresis losses within the resilient washers.

Any attempt to increase the hysteresis losses by increasing the size of the washers results in the spring force of the washers rising substantially faster than their hysteresis losses, making such a design impractical. Further, limitations of the resilient material itself make it impracticable to obtain sufficiently great hysteresis losses to provide critical dissipative damping. In addition, the hysteresis losses in the washers 12 are dependent upon both frequency and amplitude of vibration.

Vibration absorbers intended for use with single cables or conductors utilize a mass which acts as a platform to induce oscillation within the vibration absorber. Where the cable or conductor is stranded and therefore exhibits a high level of torsional damping (due to interstrand friction), torsional vibration absorbers may be employed to reflect the vertical aeolian vibrations into torsional conductor oscillations. Such torsional vibration absorbers are described in Canadian Pat. Nos. 377,602; 546,134; 559,081; 567,131; and 570,780; and in the following articles:
1. Measurement and Control of Conductor Vibration by Gordon B. Tebo AIEE Transactions Volume 60-1941 pp 1188-1193
2. Conductor Vibration—Theory of Torsional Dampers by James W. Speight AIEE Transactions Volume 60-1941 pp 907-911

Canadian Pat. No. 570,780 utilizes rubber washers to internally damp the vibration absorber. In common with the other prior art single cable vibration absorbers, however, this structure provides poor damping action since it has a high spring constant and has no means for positive damping, relying solely on hysteresis losses in the rubber.

The aforementioned prior art vibration absorbers have a limited ability to dissipate energy, pronounced resonances, and a limited effective frequency range. They also suffer from incompatibility between the spring constant required to restore the vibration absorber to its neutral position and the rubber (or other resilient material) characteristics required to provide the optimum mechanical impedance. That is, a compliance low enough to provide proper restoration to the neutral position results in an undesirably high mechanical impedance which reflects (rather than absorbing) a considerable amount of aeolian vibration energy back to the cable supports at the suspension points thereof.

In contradistinction, dampers of U.S. Patent Appln. Ser. No. 147,096, being dissipative and therefore frequency-independent, need not be concerned with the resonant frequencies of the transmission line to which they are to be attached. Further, such dampers, being essentially impedance matched (i.e., within a range of one-half to three times the characteristic impedance of the transmission line to which they are to be attached), absorb travelling waves, so that they can be placed at any desired place on the transmission line to be damped.

Thus, there remains a need for an improved vibration absorber capable of being utilized with individual suspended cables or conductors according to the aforementioned principles.

Accordingly, an object of the present invention is to provide an improved vibration absorber for individual suspended cables or conductors in which the damping effect produced is essentially dissipative and therefore frequency-independent, and wherein the damping impedance is adjustable to a value capable of essentially matching the mechanical characteristic impedance of the cable to which the vibration absorber is connected.

SUMMARY

A vibration absorber for a suspended cable, comprising a housing; a first annular member secured to said housing and having an exposed frictional surface; a clamp body having a first portion for engaging a cable in a predetermined position and a second portion rotatably mounted to said housing for rotation of said clamp body about an axis spaced apart from said predetermined position of said cable; weight means secured to said housing at a position remote from said axis; a second annular member secured to said second portion of said clamp body, and having an exposed frictional surface in rotating frictional engagement with said exposed frictional surface of said first annular member; a third annular member secured to said second major surface and to said housing, said third annular member comprising a resilient material; and means for adjusting the frictional force between said exposed frictional surfaces, said frictional force generating frictional losses upon vibration of said cable which substantially exceed any hysteresis losses within said annular members, so that the frictional force between said first and second annular members provides dissipative damping for both said cable and said third annular member.

IN THE DRAWING

FIG. 1A is a front elevation view of a vibration absorber according to a first embodiment of the invention, for damping vertical aeolian vibrations in a single suspended cable or conductor;

FIG. 1B is a partial left side cross sectional view thereof;

FIG. 1C is an exploded perspective view thereof;

FIG. 1D is a schematic front elevation view thereof;

FIG. 2E is a perspective view thereof, showing the installation position of said vibration absorber.

DETAILED DESCRIPTION

Figure 2A:
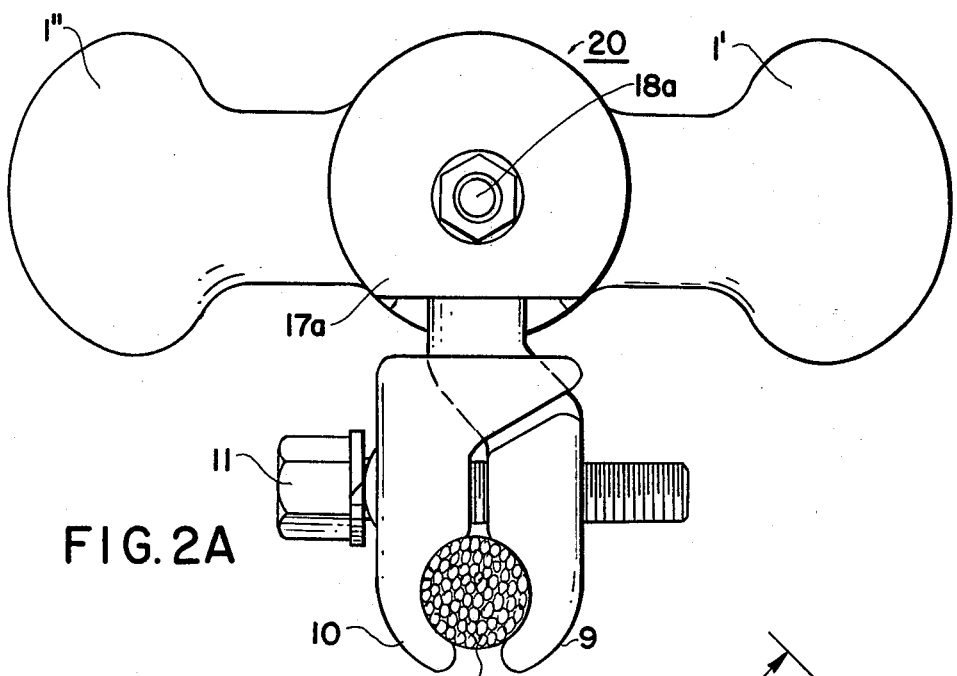
FIG. 2A is a front elevation view of a vibration absorber according to a second embodiment of the invention, for damping vertical aeolian vibrations in a suspended cable or conductor by reflecting said vibrations into a torsional mode.

Aeolian vibration derives its excitation from the minute forces associated with the release of vortices on the leeward side of conductors and cables when they are subjected to a steady air flow across their surfaces. It is believed that the excitation of aeolian vibration is derived from the detachment of the vortices.

This release of vortices produces travelling waves which proceed along the span in opposite directions from their origin towards the suspension points. These waves in turn release other vortices to reinforce and amplify the wave motion. When the travelling wave arrives at the suspension point of the conductor, that is the attachment point of the conductor to the supporting structure, it is reflected with a 180° phase reversal due to the rigidity of the support point. The damping characteristics of the conductor and the suspension hardware in this mode of vibration are very small, so that attenuation of the travelling wave is also very small. This allows the travelling wave to make a large number of passes in a given span to thereby generate a standing wave having an amplitude of constant value, the amplitude being determined by the total damping of the system.

The aforementioned vibration phenomena may be avoided by preventing the formation of a standing wave rather than attempting to control the amplitude of the standing wave. Since it is not feasible to prevent vortex detachment, the present invention provides an absorber which will absorb the travelling wave and prevent its reflection back along the conductor. This is achieved by matching the dissipative impedance of the absorber with the characteristic mechanical impedance of the conductor.

The characteristic mechanical impedance of a conductor is defined as the ratio of force and velocity amplitudes of the travelling wave. Since the mechanical impedance of the conductor is a function of the tension in the conductor and the mass of the conductor per unit length, an absorber can be designed to match the mechanical impedance of the conductor for any given installation. Further, because the use of a dissipative damper for absorbing the wave does not require a frequency dependent resilient system, the absorber may be placed at any convenient location along the span of the conductor and not, as previously described, just at $\lambda/4$ wave points of the center aeolian frequency of the conductor; although performance of the absorber will still vary somewhat with its location.

Under ideal conditions where the absorber is installed at any point on the conductor, the absorber impedance should be $k\sqrt{Tm}$, where T is the tension of the conductor, m is the mass of the conductor per unit length, and k is the damping factor which, under the aforementioned ideal conditions, equals 2.0 to reflect the fact that the conductor extends in both directions from the absorber. It has been found that significant improvements in vibration control may be achieved by selecting an absorber impedance or damping factor in the range of $0.5\sqrt{Tm}$ to $3\sqrt{Tm}$. Thus, increases in T and m due to icing of the conductors will not unduly affect the operation of the absorber.

FIGS. 1A through 1D show a "vertical" type vibration absorber 16 for directly damping vertical aeolian vibrations in the suspended cable or conductor 15, i.e., without reflecting said vibration into a torsional mode. The vibration absorber 16 has three major components, viz., a housing 17 having a central axis 18, a dumbbell 1 secured to the housing 17 and having the major portion 1a thereof remote from the axis 18, and a clamp body 9 which cooperates with a clamp keeper 10 to attach the vibration absorber 16 to the cable 15.

The clamp keeper and clamp body are urged toward each other by the bolt 11, which threadably engages the clamp body 9. The vibration absorber 16 is installed vertically, so that the housing 17 lies vertically above or below (preferably below) the cable 15, and the dumbbell 1 is vertically aligned with and extends in the same general direction as the cable 15. The axis 18 of the vibration absorber 16 is spaced apart from and extends in a direction generally orthogonal to that of the cable 15.

The clamp body 9 is rotationally mounted on the bolt 6 for rotation about the axis 18, the bolt 6 being secured by a washer 8 and nut 7.

Disposed within the housing 17 (the enclosure of which is completed by the keeper 2), are a resilient annular washer 5, annular bearing ball 4, and resilient annular bearing socket 3, all of said annular members 3, 4 and 5 being secured within the housing 17. The resilient washer 5 and bearing socket 3 are secured within the housing 17 (which includes the keeper 2) so that they do not rotate with respect thereto; while the bearing ball 4 is secured to one major surface of the clamp body 9 so that it does not rotate with respect thereto.

Rotation of the annular members 3, 4 and 5 with respect to the elements to which they are secured is prevented by engagement of peripheral protuberances on said members with corresponding recesses in the surfaces to which they are secured.

The resilient washer 5 comprises a suitable durable resilient material such as polyisoprene, an elastomeric polymer. Other suitable elastomeric polymers may of course be employed for this purpose. The ball 4 and socket 3 are preferably of rigid low friction coefficient material, with low friction coefficient surfaces.

The socket 3 has a recess therein comprising an exposed frictional surface; and the bearing ball 4 has a mating exposed frictional surface. The frictional surfaces of the ball 4 and socket 3 rotatably engage each other when the clamp body 9 rotates with respect to the housing 17, so that coulomb friction forces are generated therebetween to provide dissipative damping of corresponding vibrations.

Rotation of the clamp body 9 with respect to the housing 17 is resisted by the spring action of the resilient washer 5, which acts to restore the housing 17 to its initial or "neutral" position with respect to the clamp body 9 after the housing has been angularly deflected by aeolian vibration forces.

Dissipative energy losses occur primarily as a result of coulomb friction between the exposed frictional surfaces of the ball 4 and socket 3, losses due to hysteresis and in the resilient washer 5 being relatively small in comparison with said dissipative energy losses.

The amount of frictional force, i.e., the dissipative damping factor of the vibration absorber, may be adjusted by varying the normal force between the exposed frictional surfaces of the ball 4 and socket 3, by tightening or loosening the bolt 6 and nut 7; such adjustment having relatively little effect upon the torsional spring action of the resilient washer 5.

By appropriately selecting the contact area between the ball 4 and socket 3 and adjusting the normal force therebetween, dissipative damping factors in the aforementioned desired range of $0.5\sqrt{Tm}$ to $3\sqrt{Tm}$ can be obtained.

Preferably, the material and surface texture of the exposed frictional surfaces of the ball 4 and socket 3 should be such that the coefficient of static friction therebetween is on the order of (i.e., within 25% of) the coefficient of moving or kinetic friction therebetween. For best results, said coefficients should be essentially equal.

With the aforementioned arrangement, the engagement of the frictional surfaces of the ball 4 and socket 3 provides damping not only for the vibrations of the cable 15, but also for the resilient washer 5.

The manner in which the parameters of the vibration absorber shown in FIGS. 1A to 1D may be calculated is described below:

The absorber is to develop a mechanical impedance that lies within the limits of $$0.5\sqrt{Tm} \leq D \leq 3.0\sqrt{Tm}, \tag{1}$$

where
T = the conductor tension
m = the conductor mass per unit length

The mechanical impedance D associated with the torsional mode of operation in the vertical plane through the conductor can be derived from the actual mechanical impedance $D_T$ of the device by the following equation:

$$D = k\sqrt{Tm} = \frac{D_T}{R^2\cos^2\theta} \tag{2}$$

where
R = distance between centroid of mass and pivot axis
$\theta$ = angular deflection of the mass from the horizontal Rearranging Equation 2:

$$D_T = k\sqrt{Tm} \cdot (R^2\cos^2\theta) \tag{3}$$

The torsion damper polar moment of inertia J is related to the required mechanical impedance thereof by the equation:

$$D_T = J\omega_o \tag{4}$$

where $$(\omega_o) = 2\pi f_o \tag{5}$$

and $f_o$ is the lowest expected response frequency (Hz.).
From Equations (3) and (4):

$$J = \frac{k\sqrt{Tm} \cdot (R^2\cos^2\theta)}{\omega_o} \tag{6}$$

In most transmission lines the lowest frequency of aeolian vibration is in the order of 5 Hz., corresponding to an angular frequency $\omega_o = 10\pi$ radians/sec.

The vibration absorber mass M is given by:

$$M = (J/R^2) \tag{7}$$

Combining Equations 5 and 7 and using $\omega = 10\pi$ (other values of $\omega$ may of course be used for transmission lines having lower aeolian vibration frequencies):

$$M = \frac{k\sqrt{Tm} \cdot \cos^2\theta}{10\pi} \tag{8}$$

The vibration absorber spring constant S is given by $$S = k\sqrt{Tm} \cdot \omega_o(R^2\cos^2\theta) \qquad (9)$$

In the "vertical" vibration absorber of FIGS. 1A through 1D, the dumbbell 1 is asymmetrically positioned with respect to the axis 18.

The vibration absorbers described herein provide a substantial improvement in suppression of aeolian vibration, operate over a wide range of frequencies, exhibit improved durability, and need not be positioned at particular points of the suspended cable.

Preferably, for optimum performance the vibration absorbers should be positioned at a distance $\chi$ from the insulator support for the corresponding span given by:

$$x = \frac{1}{4f_1}\sqrt{\frac{T}{m}} \qquad (10)$$

where $f_1$ is the predominant anticipated frequency of aeolian vibration (typically 15 Hz.).

In the vibration absorber 20 shown in FIGS. 2A through 2D, the rotational axis 18a thereof is arranged parallel to the cable 15, and in a different vertical plane, so that the dumbbells 1' and 1" (which are symmetrically positioned with respect to the axis 18a and housing 17a) reflect vertical aeolian vibrations into torsional oscillations of the conductor 15. Parts of the vibration absorber 20 which correspond to similar parts of the vibration absorber 16 are identified with the same numerals. The numeral 12 identifies a lockwasher for the bolt 11.

Figure 2B:
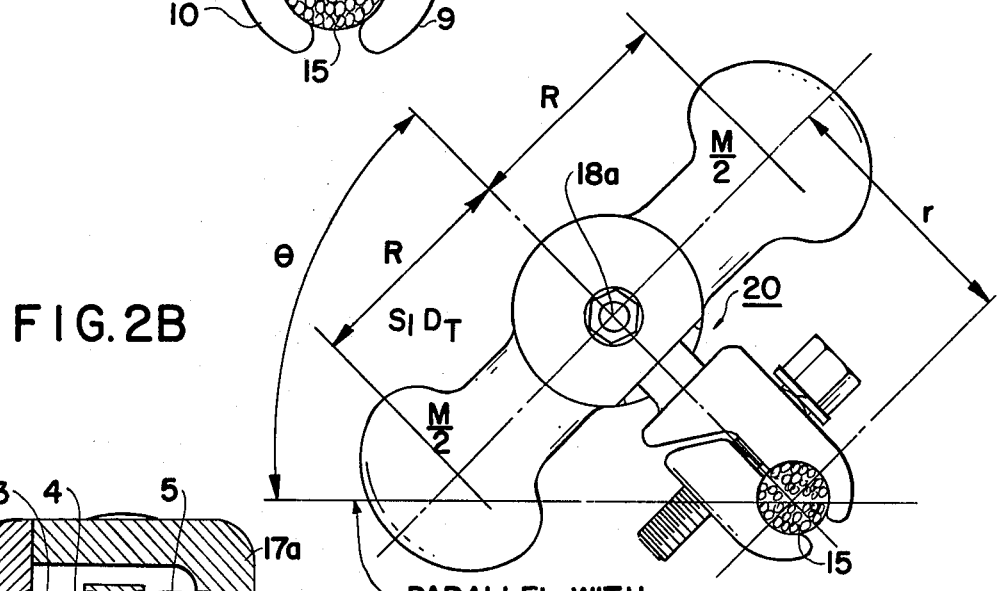
FIG. 2B is a front elevation view thereof, showing the installation position of said vibration absorber.
Figure 2C:
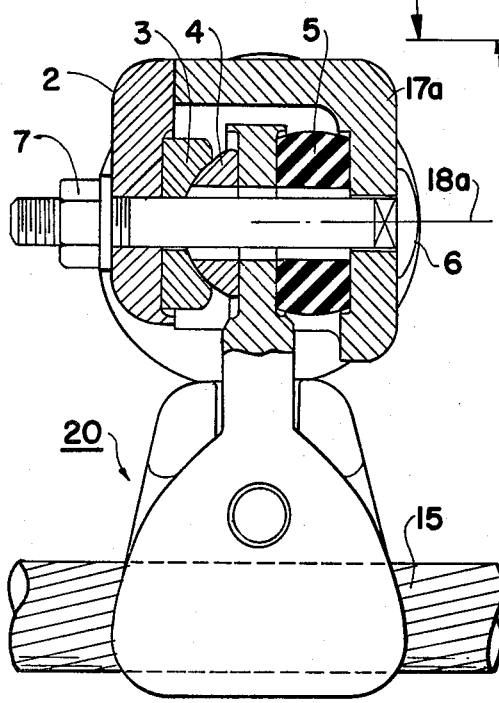
FIG. 2C is a partial right side elevation cross-sectional view thereof.
Figure 2D:
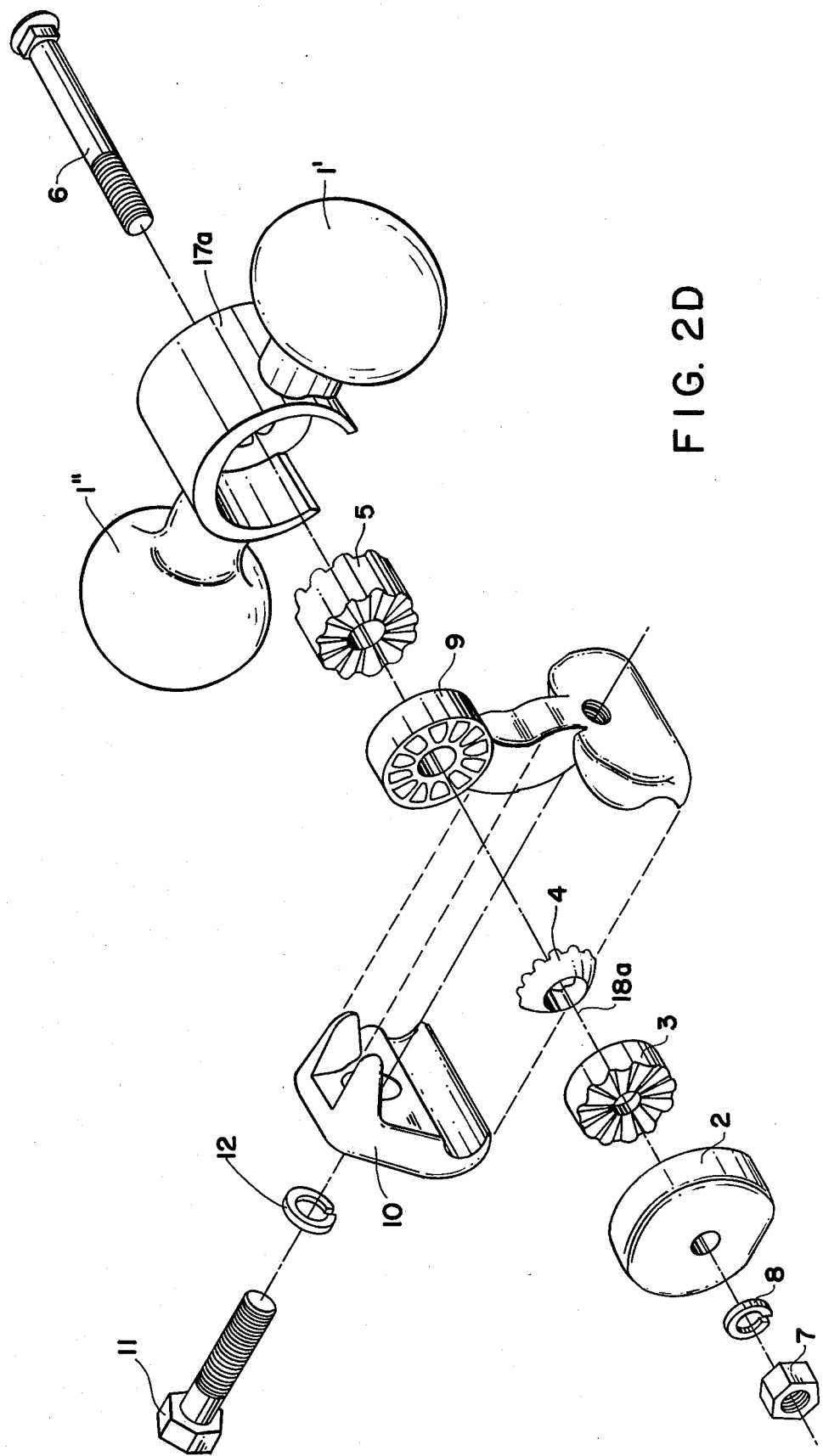
FIG. 2D is an exploded perspective view thereof.

As shown in FIG. 2B, the vibration absorber 20 is preferably installed so that a line extending from the conductor 15 to the vibration absorber axis 18a is essentially horizontal. Good results may be obtained provided that said angle is maintained in the range of $-60°$ to $+60°$ from the horizontal.

In the embodiment designed to operate in a torsional mode in a vertical plane perpendicular to the longitudinal conductor axis, as shown in FIGS. 2A and 2B, one must determine the dissipative mechanical impedance of the coulomb element $D_T$, the spring constant $S_1$ of the spring element required to return the mass to the neutral axis, the mass M, the distance R, the half masses M/2 are displaced from their axis of rotation 18a, the length of the clamp arm r and the installation distance $\chi$ at which the device should be spaced from the support point. These parameters are given by:

$$D_T = k\sqrt{T \cdot m} \cdot r^2 \cdot \cos^2\theta \qquad (11)$$

$$M = \frac{1}{\sqrt{\frac{T}{m}}} \cdot \frac{S}{\pi^2 \cdot r^2 \cdot \cos^2\theta} \cdot \frac{f_3}{f_o^2} \qquad (12)$$

$$S_1 = k\sqrt{T \cdot m} \cdot r^2 \cdot \cos^2\theta \cdot 2\pi f_o \qquad (13)$$

$$R = \sqrt{\frac{r^4 \cdot \pi \cdot k \cdot T \cdot f_o \cdot \cos^4\theta}{2 \cdot S \cdot f_3}} \qquad (14)$$

$$\chi = \frac{1}{4f_3} \cdot \sqrt{\frac{T}{m}} \qquad (15)$$

where:
k = Damping constant, $0.5 \leq k \leq 3.0$ and k = 2.0 is ideal
T = Conductor tension, lbs.
m = Conductor mass per unit length, lb ft$^{-2}$ sec$^2$
S = Torsional stiffness of the conductor per unit length, lb ft$^2$ rad$^{-1}$
$f_3$ = Mid frequency of expected aeolian vibration range, Hz
$f_o$ = Desired lower threshold frequency, Hz
M = Dumbbell mass, lb ft$^{-1}$ sec$^2$
r = Offset distance-Conductor centre to rotational axis of mass M
$S_1$ = Torsional stiffness of dumbbell, ft lb rad$^{-1}$
R = Distance from centroid of effective mass M/2 and rotational axis of mass M, ft.
$\chi$ = Distance from absorber to conductor support point, ft.
D = Required dissipative mechanical impedance, lb ft$^{-1}$ secs.
$D_T$ = Required dissipative mechanical impedance of coulomb element, lb ft secs.

The amplitude of angular deflection $\delta$ of the dumbbell mass is given by $$\delta = (Mgr)/S \qquad (12)$$

where g = acceleration of gravity and should preferably be such that the dumbbell does not deflect into contact with the housing.

What is claimed is:
1. A coulomb-type vibration absorber for an individual suspended cable, comprising:
   a housing;
   a first annular member secured within said housing and having an exposed frictional surface;
   a clamp body having a first portion oriented in a predetermined position for engaging a cable and a second portion rotatably mounted to said housing for rotation of said clamp body about an axis generally parallel to said predetermined position, said second portion of said clamp body having first and second opposed major surfaces;
   weight means secured to said housing at a position remote from said axis;
   a second annular member disposed within said housing, secured to said first major surface and having an exposed frictional surface remote from said first major surface and in rotating frictional engagement with said exposed frictional surface of said first annular member,
   the coefficient of static friction between said exposed frictional surfaces being substantially equal to the coefficient of kinetic friction therebetween;
   a third annular member secured to said second major surface and disposed within and secured to said housing, said third annular member comprising a resilient material; and
   means for adjusting the coulomb frictional force between said exposed frictional surfaces, said adjusting means comprising a bolt extending along said axis through said housing members and clamp body and a nut threadably attached to said bolt, said frictional force generating frictional losses upon vibration of a cable, when engaged by said first portion of said clamp body, which substantially exceed may hysteresis losses within said annular members, so that the coulomb frictional force between said first and second annular members provides dissipative damping for both a cable when so engaged, and for said third annular member.

2. The vibration absorber according to claim 1, wherein said weight means is symmetrically disposed with respect to said axis.

3. The vibration absorber according to claim 1, wherein said third annular member comprises a resilient elastomeric polymer.

4. The vibration absorber according to claim 3, wherein said polymer comprises polyisoprene.

5. The vibration absorber according to claim 1, wherein said cable extends in a predetermined direction, and said weight means is asymmetrically disposed with respect to said axis, and is secured to said housing at a position remote from said axis and spaced therefrom in approximately said predetermined direction.

6. The vibration absorber according to claim 5, wherein said third annular member comprises a resilient elastomeric polymer.

7. In combination,
a single suspended cable having a mechanical characteristic impedance given by $\sqrt{Tm}$, where T is the cable tension and m is the cable mass per unit length; and
a vibration absorber for said cable, comprising:
a housing;
a first annular member secured within said housing and having an exposed frictional surface;
a clamp body having a first portion engaging said cable in a predetermined position and a second portion rotatably mounted to said housing for rotation of said clamp body about an axis generally parallel to said predetermined position of said cable, said second portion of said clamp body having first and second opposed major surfaces;
weight means secured to said housing at a position remote from said axis;
a second annular member disposed within said housing, secured to said first major surface and having an exposed frictional surface remote from said first major surface and in rotating frictional engagement with said exposed frictional surface of said first annular member;
a third annular member secured to said second major surface and disposed within and secured to said housing, said third annular member comprising a resilient material; and
means for adjusting the coulomb frictional force between said exposed frictional surfaces, said frictional force generating frictional losses upon vibration of said cable which substantially exceed any hysteresis losses within said annular members, so that the coulomb frictional force between said first and second annular members provides dissipative damping for both said cable and said third annular member, with a damping factor equal to $k\sqrt{Tm}$, where $0.5 \leq k \leq 3$.

8. The combination according to claim 7, wherein said axis is situated with respect to said cable so that the angle between a line normal to and intersecting said axis and cable and the horizontal is oriented at an angle between $-60°$ and $+60°$ with respect to the horizontal.

9. In combination,
a single suspended cable having a mechanical characteristic impedance given by $\sqrt{Tm}$, where T is the cable tension and m is the cable mass per unit length; and
a vibration absorber for said cable, comprising:
a housing;
a first annular member secured within said housing and having an exposed frictional surface;
a clamp body having a first portion engaging said cable and extending in a predetermined direction, and a second portion rotatably mounted to said housing for rotation of said clamp body about an axis generally orthogonal to said predetermined direction, said second portion of said clamp body having first and second opposed major surfaces;
weight means secured to said housing at a position remote from said axis and spaced therefrom in approximately said predetermined direction;
a second annular member disposed within said housing, secured to said first major surface and having an exposed frictional surface remote from said first major surface and in rotating frictional engagement with said exposed frictional surface of said first annular member;
a third annular member secured to said second major surface and disposed within and secured to said housing, said third annular member comprising a resilient material; and
means for adjusting the coulomb frictional force between said exposed frictional surfaces, said frictional force generating frictional losses upon vibration of said cable which substantially exceed any hysteresis losses within said annular members, so that the coulomb frictional force between said first and second annular members provides dissipative damping for both said cable and said third annular member, with a damping factor equal to $k\sqrt{Tm}$, where $0.5 \leq k \leq 3$.

10. In combination,
a single suspended cable having a mechanical characteristic impedance given by $\sqrt{Tm}$, where T is the cable tension and m is the cable mass per unit length; and
a vibration absorber for said cable, comprising:
a housing;
a first annular member secured to said housing and having an exposed frictional surface;
a clamp body having a first portion engaging said cable in a predetermined position and a second portion rotatably mounted to said housing for rotation of said clamp body about an axis spaced apart from said predetermined position of said cable;
weight means secured to said housing at a position remote from said axis;
a second annular member secured to said second portion of said clamp body having an exposed frictional surface in rotating frictional engagement with said exposed frictional surface of said first annular member;
resilient means coupling said clamp body to said housing; and
means for adjusting the coulomb frictional force between said exposed frictional surfaces, said frictional force generating frictional losses upon vibration of said cable with substantially exceed any hysteresis losses within said annular members, so that the coulomb frictional force between said first and second annular members provides dissipative damping for both said cable and said third annular member, with a damping factor equal to $k\sqrt{Tm}$, where $0.5 \leq k \leq 3$.

* * * * *